United States Patent Office 3,462,525
Patented Aug. 19, 1969

3,462,525
DENTAL COMPOSITIONS COMPRISING LONG-CHAIN OLEFIN SULFONATES
Henry Leon Levinsky and Joseph Rubinfeld, Brooklyn, N.Y., assignors to Colgate-Palmolive Company, New York, N.Y., a corporation of Delaware
No Drawing. Filed Sept. 15, 1966, Ser. No. 579,524
Int. Cl. A61k 27/00
U.S. Cl. 424—56                                11 Claims This invention relates to a dental preparation. In particular, it relates to a dental preparation including an olefin sulfonate as a detergent.

Detergents have been used in dental preparations for several years. They have the advantages over prior soap-containing dental preparations of being more effective foaming agents. However, certain problems, such as inadequate foaming and instability, have remained even in some dental preparations containing detergents. Moreover, the use of detergents in dental preparations has often caused an undesirable taste to be noted when acidic foods, such as fruits or juices, are brought into contact with the oral cavity in point of time proximate to contact of the oral cavity with a detergent-containing dental preparation, such as a dentifrice. This is commonly called the "orange juice effect."

It is an object of this invention to provide a detergent-containing dental preparation which has an unexpectedly good taste, is substantially free of undesirable "orange juice" flavor reaction, does not irritate tender mucous membranes in the oral cavity, exhibits excellent rapid foaming characteristics in the oral cavity, has superior antibacterial activity, and has superior foaming and stability characteristics upon storage. Other objects will be apparent from consideration of the following description.

In accordance with certain of its aspects, this invention relates to a dental preparation comprising a water-soluble long-chain olefin sulfonate detergent material and a dental dispersing agent compatible with said detergent material.

The compositions which are utilizable in accordance with this invention include preparations designed for application to the oral cavity. These compositions are referred to herein as dental preparations and include dentifrices such as toothpastes or dental creams, tooth powders and liquid dentifrices, mouth washes or rinses, dental chewing gums, dental floss, tablets, lozenges and troches.

In accordance with certain aspects of this invention, the dental preparation is substantially liquid in character, such as a mouth wash or rinse. In such a preparation the dispersing agent compatible with alkenyl sulfonates is typically a water-alcohol mixture. Generally, the ratio of water to alcohol is about 1–20:1 by weight, preferably 3–20:1 by weight, most preferably about 17:3 by weight. The total amount of water-alcohol in this type of preparation is typically about 70–99.95% by weight of the preparation. The pH of such liquid preparations is generally about 4.5–9, typically about 5.5–8.

In the formulation of such liquid dental preparations the olefin sulfonate detergent material is typically present in amount of about 0.05–10%, preferably about 0.1–7%, most preferably about 0.6%, based on the weight of the preparation.

Certain other ingredients may also be employed in the liquid dental preparations. These include adjuvants for color, for flavor, for smoothness such as polyols, for example, sorbitol and glycerine, and bacteriostatic agents. Typical bacteriostatic agents are quaternary ammonium compounds having the formula

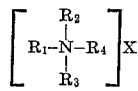

wherein $R_1$ is a hydrophobic radical selected from the group consisting of aliphatic, cycloaliphatic, acyl, aliphaticaryl and arylaliphatic radicals, $R_2$, $R_3$, and $R_4$ are each hydrocarbon radicals having 1–10 carbon radicals, the sum of the carbon atoms in $R_2$, $R_3$, and $R_4$ being from 3–12 and X is a salt-forming radical. A typical quaternary compound of this type is para-di-isobutyl-phenoxyethoxy-ethyl dimethyl benzyl ammonium chloride (sold as Hyamine 1622).

Surface active agents in addition to the olefin sulfonates may also be employed in the liquid dental preparations of this invention. When bacteriostatic agents, such as those described above, are employed, it is preferred to include surface active agents such as the polyoxyethylene derivatives of partial fatty acid esters of hexitol anhydrides (sold as Tweens).

In accordance with certain further aspects of this invention, the dental preparation is substantially solid in character, such as a tooth paste or dental cream or a tooth powder. In such a preparation the dispersing agent compatible with olefin sulfonates is a water-insoluble dental polishing material.

The polishing agent may be any of the type commonly employed in dental preparations. These include water-insoluble sodium metaphosphate, potassium metaphosphate, tricalcium phosphate, dihydrated dicalcium phosphate, anhydrous dicalcium phosphate, calcium pyrophosphate, magnesium orthophosphate, trimagnesium phosphate, calcium carbonate, alumina, aluminum silicate, zirconium silicates and mixtures thereof. The most preferred polishing agents are insoluble sodium metaphosphate and dihydrated and anhydrous dicalcium phosphate. Typically the polishing agent is finely divided and has an average particle size below about 10 microns, preferably about 2–6 microns and most preferably about 3.5–5 microns.

When a water-insoluble dental polishing agent is employed as the compatible vehicle for the olefin sulfonate, it is typically employed in amount of about 20–99% by weight of the dental preparation. Preferably it is present in amount of about 20–75% in tooth paste and about 70–99% tooth powder.

In the solid dental preparations of this invention the olefin sulfonate detergent material is typically present in amount of at least about 0.05% by weight, preferably about 0.1–10% and most preferably 0.5–5%.

The substantially solid dental preparations including polishing agent as the compatible dispersing agent may contain liquid ingredients when in the form of a tooth paste. Such liquid ingredients include water, typically in amount of 10–20% by weight of the preparation. Glycerine, sorbitol, propylene glycol, and the like may also be present as humectants or binders. Particularly advantageous liquid ingredients include a mixture of water, glycerine and sorbitol. A gelling agent, such as the natural or synthetic gums or gum-like materials, typically Irish moss or sodium carboxymethylcellulose may be employed. Other gelling agents which may be employed include gum tragacanth, polyvinylpyrrolidone, starch, and the like. They are usually present in tooth paste in an amount up to about 10% by weight, preferably about 0.5–5%.

The pH of the fiinal formulations of the present invention is variable and, therefore, the products may have any suitable pH value in solution compatible with the stability of the material. Where reference is made to pH value, it has reference to the pH as determined on a liquid product per se, and in the case of a dental cream or powder or similar product as determined on a 20% aqueous slurry or mixture of said cream or powder. Thus, it is generally desired that the pH of the product under the testing conditions indicated be from about 5 up to about 10, and preferably from about 5.5 to 9, with optimum desired effects at a substantially neutral pH value in solution, for example, about 6 to 8.

Various additional ingredients may be present in the dental preparations. These include flavoring materials such as flavoring oils and soluble saccharin, coloring or whitening agents such as sodium pyrophosphate, emulsifying agents, silicones, chlorophyll compounds, antibiotics such as macrolides and the like.

The olefin sulfonate detergent material used in the practice of this invention typically contains long chain alkenyl sulfonates. They are produced by the sulfonation of mono-olefins using sulfur trioxide ($SO_3$) as the sulfonating agent. This $SO_3$ is reacted with olefins of the formula $R_1CH=CHR$, wherein R is an alkyl radical and $R_1$ is alkyl or hydrogen, preferably hydrogen, by bringing a stream of $SO_3$( highly diluted with an inert gas such as air) into contact with the olefin, preferably an alpha-olefin, to produce a viscous acidic product which contains alkene sulfonic acids and sultones. On hydrolysis and neutralization, as by treatment with strong aqueous alkali, sultones in the product are converted to the corresponding hydroxy-alkane sulfonates, giving an olefin sulfonate product containing a minor proportion of long chain alkenyl sufonic acids and a greater proportion of long chain hydroxyalkane sulfonic acids (for example, a major portion such as 70% of the total anionically active component), together with water-insoluble inactive long chain compounds such as sultones. To produce higher yield of the preferred olefin sulfonates, the $SO_3$-olefin reaction product may be treated with strong sulfuric acid prior to neutralization. After neutralization, the product of the treatment, which is preferably employed in the practice of the present invention, has an increased proportion of alkenyl sulfonate and a minor proportion (for example, ⅓ of the total sulfonate content or less) or none at all, of the hydroxyalkane sulfonate. Analysis of the product indicates that the major portion of its alkenyl sulfonate content is usually Δ-3,4-alkenyl sulfonate. The olefin sulfonate detergents also may contain minor quantities of disulfonates, presumably produced in the course of sulfonation treatment by reaction of excess $SO_3$ with the alkenyl sulfonate formed during sulfonation.

The α-olefin feedstock to be sulfonated preferably contains olefins of 8–25 carbon atoms, most preferably 12–21 carbon atoms. The feedstock may contain minor amounts of other constituents such as secondary or internal olefins, diolefins, cyclic olefins, armomatics, naphthalenes and alkanes, and may be produced by cracking of petroleum wax, catalytic polymerization of ethylene, dehydration of long chain alcohols, etc. Best results have thus far been obtained when α-olefins (where $R_1$ is H) constitute a major proportion, for example, about 70% and preferably at least 90%, of the feedstock. A particularly preferred olefin feedstock contains in the range of about 12 to 21 carbon atoms in the molecule and yields olefin sulfonates having excellent detergency properties. Especially good foaming characteristics have been obtained by the use of a feed stock whose alpha-olefin content consists essentially of compounds of 15 to 18 carbon atoms.

The detergent material produced in accordance with the process described above typically contains at least about 50% by weight of long-chain alkenyl sulfonate, up to about 33% by weight of hydroxy alkane sulfonate, and up to about 15% of impurities, such as long-chain water-insoluble sultones, most of which impurities are characterized as being soluble in acetone. If such impurities are present, they may, if desired, be substantially removed by extraction or recrystallization prior or subsequent to neutralization of the $SO_3$-olefin reaction product. Typically, an acetone-water solution is employed to remove the acetone-soluble materials. However, it has been found that olefin sulfonate detergent material containing up to about 15% by weight of such acetone-soluble impurities is effective in obtaining the composition of the invention which is characterized by the aforementioned desirable properties.

The olefin sulfonate is generally employed in the form of its sodium salt. It is within the scope of this invention to use other water-soluble salts, for example, salts of other alkali metals such as potassium, salts of alkaline earth metals, such as magnesium and calcium, triethanolamine salts and the like, as well as mixtures of a salt such as a sodium salt with the free olefin sulfonic acid.

The following examples are given to illustrate the invention. All parts and proportions in the examples are by weight, unless otherwise indicated.

Example 1

A $C_{15}$–$C_{18}$ olefin sulfonate containing sodium alkenyl sulfonate and sodium hydroxyalkane sulfate is prepared in the manner described below and blended with other ingredients as tabulated below, to form a dental cream:

|  | Percentage |
|---|---|
| Glycerine | 26 |
| Sodium carboxymethylcellulose | 0.8 |
| Sodium benzoate preservative | 0.5 |
| Sodium saccharinate | 0.2 |
| Tetrasodium pyrophosphate | 0.25 |
| Water | 16.95 |
| Sodium olefin sulfonate | 2.3 |
| Insoluble dicalcium phosphate dihydrate (a polishing agent having an average particle diameter of about 3.8–4.6 microns) | 52.0 |
| Flavor | 1.0 |

The ingredients are mixed at room temperature in the order listed above with the aid of a Lightnin stirrer. Prior to the addition of the olefin sulfonate the ingredients form a gel in which the olefin sulfonate dissolves readily: thereafter, the polishing agents and flavor are blended in. The mixture is then deaerated in a vacuum desiccator with stirrer and placed in the usual flexible toothpaste tubes.

The resulting dental cream is a very satisfactory product having a pH of about 7.3 with excellent taste and white color and abundant rapid foam.

Satisfactory results are also obtained when insoluble sodium metaphosphate is used in place of insoluble dicalcium phosphate dihydrate.

The olefin sulfonate used in the above formula is prepared by reacting air-diluted $SO_3$ with an olefin feedstock followed by treatment of the resulting viscous acidic product with sulfuric acid (supplied as 20% oleum), and neutralization and reaction at about 95° C. with excess aqueous sodium hydroxide for several hours followed by treatment of the resulting aqueous syrupy product on a pair of rotation drums heated to about 150° C. to drive off water. The resulting product has a content of anionically active material of 80%, on a dry basis, and a content of "free oil" of about 2% (based on the amount of active material). "Free oil" is material obtained on pentane extraction of an aqueous ethanol solution of the product. The product is then dissolved, reprecipitated and washed, as described below.

The olefin feedstock contains about 88% of terminally unsaturated straight chain olefins having an average molecular weight of 230 and an average chain length of about 15 to 18 carbons ($C_{15}$–24%, $C_{16}$–29%, $C_{17}$–30%, $C_{18}$–17%, approximately) and has a boiling range, at atmospheric pressure, of about 265–300° C. (with 11% residue). In the sulfonation reaction the olefin feedstock is distributed as a falling film over the inner wall of a vertically mounted reaction tube (6 meters high) at the top thereof, and a gaseous mixture of air and $SO_3$ (4% $SO_3$ by volume) is injected downward at a high volumetric ratio into the center of the reaction tube at the top thereof. The ingredients are supplied at the following hourly rates:

| | Kg. |
|---|---|
| Olefin feedstock | 17.5 |
| SO₃ | 6.5 |
| Oleum | 3 |

Example 2

| | Percentage |
|---|---|
| Water | 73.7 |
| Ethyl alcohol | 25.0 |
| Polyoxyethylene sorbitan monooleate (Tween 80) | 0.7 |
| Sodium olefin sulfonate | 0.58 |
| Saccharin | 0.02 |

The ingredients and procedures for making the sodium olefin sulfonate are as in Example 1. The mouthwash is completely soluble, has a pleasant foamy action when taken into the mouth, and leaves a clear breath.

Although the present invention has been described with reference to particular embodiments and examples, it will be apparent to those skilled in the art that variations and modifications can be substituted therefor without departing from the principle and true spirit of the invention.

What is claimed is:
1. A dental mouth wash preparation comprising about 0.05–10% by weight of a water-soluble long-chain olefin sulfonate detergent material and a mixture of water and ethanol dispersing agent compatible with said detergent material, the ratio of water to alcohol being about 1–20.1 by weight.
2. A dental preparation as claimed in claim 1 wherein said olefin sulfonate contains olefinic group of 8–25 carbon atoms.
3. A dental preparation as claimed in claim 1 wherein said olefin sulfonate contains olefinic group of 12–21 carbon atoms.
4. A dental preparation as claimed in claim 1 wherein said olefin sulfonate is present in amount of about 0.1–7% by weight of the dental preparation.
5. A dental dentrifice preparation comprising about 0.05–10% by weight of a water-soluble long-chain olefin sulfonate detergent material and a solid water-insoluble dental polishing material dispersing agent compatible with said detergent material.
6. A dental preparation as claimed in claim 5 wherein said olefin sulfonate is present in amount of about 0.5–5% by weight of a dental preparation.
7. A dental preparation as claimed in claim 5 wherein said dental polishing material comprises insoluble sodium metaphosphate.
8. A dental preparation as claimed in claim 5 wherein said dental polishing material comprises dicalcium phosphate.
9. A dental preparation as claimed in claim 5 wherein said dental polishing material is present in amount of about 20–99% by weight of said dentifrice.
10. A dental preparation as claimed in claim 5 wherein said olefin sulfonate contains olefinic group of 8–25 carbon atoms.
11. A dental preparation as claimed in claim 5 wherein said olefin sulfonate contains olefinic group of 12–21 carbon atoms.

References Cited

UNITED STATES PATENTS

| | | | |
|---|---|---|---|
| 3,342,687 | 9/1967 | Gould | 167—93 |
| 3,346,629 | 10/1967 | Broussalian | 260—513 |

OTHER REFERENCES

Weil et al., The Journal of the American Chemists' Society, vol. 42, No. 10, pp. 873–875, October 1965.

RICHARD L. HUFF, Primary Examiner

U.S. Cl. X.R.

424—49, 54, 57, 58